(12) United States Patent
Jörn et al.

(10) Patent No.: US 7,964,131 B2
(45) Date of Patent: Jun. 21, 2011

(54) METHOD AND APPARATUS FOR ACTIVATING THE BINDER ON A SEMI-FINISHED FIBER PREFORM BY DIRECT HEATING OF CARBON FIBERS THROUGH AN APPLIED ELECTRICAL VOLTAGE

(75) Inventors: Paul Jörn, Hamburg (DE); Axel Siegfried Herrmann, Peine (DE)

(73) Assignee: Airbus Deutschland GmbH, Hamburg (DE)

(*) Notice: Subject to any disclaimer, the term of this patent is extended or adjusted under 35 U.S.C. 154(b) by 1157 days.

(21) Appl. No.: 10/983,395

(22) Filed: Nov. 8, 2004

(65) Prior Publication Data
US 2005/0140064 A1 Jun. 30, 2005

(30) Foreign Application Priority Data
Nov. 13, 2003 (DE) .................. 103 53 070

(51) Int. Cl.
B29C 35/02 (2006.01)
(52) U.S. Cl. ........ 264/258; 264/425; 264/449; 264/451; 156/245; 156/273.9
(58) Field of Classification Search ............... 156/273.9, 156/245; 264/258, 405, 413, 425, 449, 451; 425/543
See application file for complete search history.

(56) References Cited

U.S. PATENT DOCUMENTS

| | | | | |
|---|---|---|---|---|
| 3,668,058 A * | 6/1972 | Pappadakis | ........... | 428/215 |
| 4,148,949 A * | 4/1979 | Casper et al. | ........... | 427/391 |
| 4,167,538 A * | 9/1979 | Taniguchi et al. | ........... | 525/438 |
| 4,219,457 A * | 8/1980 | Taniguchi et al. | ........... | 523/205 |
| 4,385,957 A * | 5/1983 | Wackerle et al. | ........... | 156/273.9 |
| 4,663,225 A * | 5/1987 | Farley et al. | ........... | 442/71 |
| 4,842,787 A * | 6/1989 | Chess, Jr. et al. | ........... | 264/40.6 |
| 4,882,089 A | 11/1989 | Iwaskow et al. | ........... | 428/242 |
| 5,123,373 A * | 6/1992 | Iyer et al. | ........... | 118/612 |
| 5,139,845 A * | 8/1992 | Beckerman et al. | ........... | 428/117 |
| 5,154,787 A * | 10/1992 | Gardner et al. | ........... | 156/166 |
| 5,356,692 A * | 10/1994 | Perez | ........... | 428/116 |
| 5,443,778 A * | 8/1995 | Schlingman | ........... | 264/257 |
| 5,451,351 A * | 9/1995 | Blackmore | ........... | 264/449 |
| 5,648,137 A * | 7/1997 | Blackmore | ........... | 428/102 |
| 5,993,905 A * | 11/1999 | Sheehan | ........... | 427/294 |
| 6,146,576 A * | 11/2000 | Blackmore | ........... | 264/404 |
| 6,620,510 B1 * | 9/2003 | Taguchi et al. | ........... | 428/413 |
| 6,699,427 B2 * | 3/2004 | Huang et al. | ........... | 264/434 |
| 6,878,331 B2 * | 4/2005 | Huang et al. | ........... | 264/434 |
| 6,878,731 B2 * | 4/2005 | Cui et al. | ........... | 514/385 |
| 7,008,580 B2 * | 3/2006 | Eberth et al. | ........... | 264/103 |
| 7,011,785 B2 * | 3/2006 | Bauer et al. | ........... | 264/405 |
| 7,011,786 B2 * | 3/2006 | Bauer et al. | ........... | 264/405 |
| 7,037,865 B1 * | 5/2006 | Kimberly | ........... | 442/181 |
| 7,052,567 B1 * | 5/2006 | Blackmore et al. | ........... | 156/94 |
| 7,135,087 B2 * | 11/2006 | Blackmore et al. | ........... | 156/293 |
| 7,207,424 B2 * | 4/2007 | Huang et al. | ........... | 188/251 A |
| 7,267,739 B2 * | 9/2007 | Blackmore et al. | ........... | 156/293 |
| 2001/0035592 A1 * | 11/2001 | Strasser et al. | ........... | 264/173.1 |
| 2002/0059886 A1 * | 5/2002 | Merkley et al. | ........... | 106/805 |

(Continued)

Primary Examiner — Joseph S Del Sole
Assistant Examiner — Seyed Masoud Malekzadeh
(74) Attorney, Agent, or Firm — Young Basile

(57) ABSTRACT

The present invention relates to an apparatus and a method to activate a binder on a semi-finished fiber material containing carbon fibers or on a preform. The binder is applied to the semi-finished fiber material or the fiber preform and subsequently activated through increasing the temperature by conducting an electrical current through the carbon fibers of the preform.

16 Claims, 1 Drawing Sheet

U.S. PATENT DOCUMENTS

| | | | | |
|---|---|---|---|---|
| 2002/0106952 | A1* | 8/2002 | Hashizume et al. | 442/43 |
| 2003/0089237 | A1* | 5/2003 | Jagtoyen et al. | 96/108 |
| 2003/0168164 | A1* | 9/2003 | Blackmore et al. | 156/308.2 |
| 2003/0168757 | A1* | 9/2003 | Bauer et al. | 264/29.1 |
| 2003/0168775 | A1* | 9/2003 | Eberth et al. | 264/258 |
| 2003/0173019 | A1* | 9/2003 | Eberth et al. | 156/176 |
| 2003/0213556 | A1* | 11/2003 | Blackmore et al. | 156/294 |
| 2004/0016467 | A1* | 1/2004 | Blackmore et al. | 138/99 |
| 2004/0017019 | A1* | 1/2004 | Huang et al. | 264/29.5 |
| 2004/0105969 | A1* | 6/2004 | Huang et al. | 428/292.1 |
| 2004/0155382 | A1* | 8/2004 | Huang et al. | 264/450 |
| 2004/0247722 | A1* | 12/2004 | Acklam et al. | 425/129.1 |
| 2005/0179152 | A1* | 8/2005 | Bauer et al. | 264/29.1 |
| 2006/0116466 | A1* | 6/2006 | Kadowaki et al. | 524/495 |

* cited by examiner

1

METHOD AND APPARATUS FOR ACTIVATING THE BINDER ON A SEMI-FINISHED FIBER PREFORM BY DIRECT HEATING OF CARBON FIBERS THROUGH AN APPLIED ELECTRICAL VOLTAGE

BACKGROUND OF THE INVENTION

The present invention relates to an apparatus and a method for activating a binder substance on a fiber preform which contains carbon fibers. Activation of the binder stabilizes and sets the fiber preform; a component made of carbon fiber reinforced composites can then be produced from a fiber preform. In what follows, a semi-finished fiber material is understood to mean a fiber package which does not yet exhibit the shape of the component, has not yet undergone the forming process, or is still unformed. A fiber preform is understood to mean a fiber package which already possesses the shape of the component, or which has been fully formed. The fiber preform has not necessarily been stabilized and set.

Components today made of carbon fiber reinforced composites are produced from pre-impregnated semi-finished materials, prepregs, or from dry semi-finished fiber materials which are then impregnated with resin. If dry semi-finished fiber materials are used, a fiber pre-form is usually produced first from these semi-finished fiber materials; this is a dry fiber package which already anticipates the later shape of the component. Today, the dry semi-finished fiber materials or the cloth pre-products, for example wovens or multiaxial reinforcements, are assembled and then brought to the desired shape by reorienting and reshaping (draping) the arrangement of the fibers. A woven, for instance, is a fabric produced on a loom composed of two orthogonal filament systems (weft and warp); a multiaxial reinforcement consists of several layers of fiber which are laid on top of each other in different directions and are stitch bonded using thin threads. A binder system may be used to assist in setting the preforms. The binder systems in use are mostly thermosetting or thermoplastic substances which may be in powdered form, are used in a relatively small quantity, in the range of 2 to 5 percent by weight for instance, are applied to the semi-finished material and activated under the effects of heat or by increasing the temperature. In addition to establishing the fiber orientation, the binder systems can be used to set the preforms in a more compacted state. Setting the preform effects a punctiform, loose set of the fiber laminate, or of its shape, more or less an initial setting. A preform set in this way can then be stacked and warehoused prior to further processing. The final fiber-composite laminate, or the final component, is then produced by saturating the set preform with a relatively large volume of a matrix (between 25 and 85 percent by volume relative to the component, for instance,) and by subsequent curing of the matrix component, or by allowing it to harden.

In the case of the prior art methods of setting the preform, the binder is usually activated by heating the preform, for example with the aid of an infra-red heater or hot air (in an oven for instance, or with a hot air gun). A serious disadvantage of these prior art methods is that they can only heat the preform very slowly over the entire material thickness since the energy transfer is not very high and the preform tooling, described in what follows as the preform shaping apparatus, is also heated up and the tooling or the apparatus must then be cooled down again in a long cool-off phase. For this reason, the cycle times in preform production in the prior art are relatively long.

SUMMARY OF THE INVENTION

The task of the present invention is to provide a method and an apparatus with the aid of which activation of the binder in the fiber preform can be accomplished in a substantially reduced amount of time and cycle frequency for the preform can thereby be substantially increased.

This task is accomplished by the apparatus and the method as described hereinafter. Advantageous improvements to the apparatus under the invention as well to the method under the invention are also described hereinafter.

DETAILED DESCRIPTION OF THE PREFERRED EMBODIMENT

Figure 1:
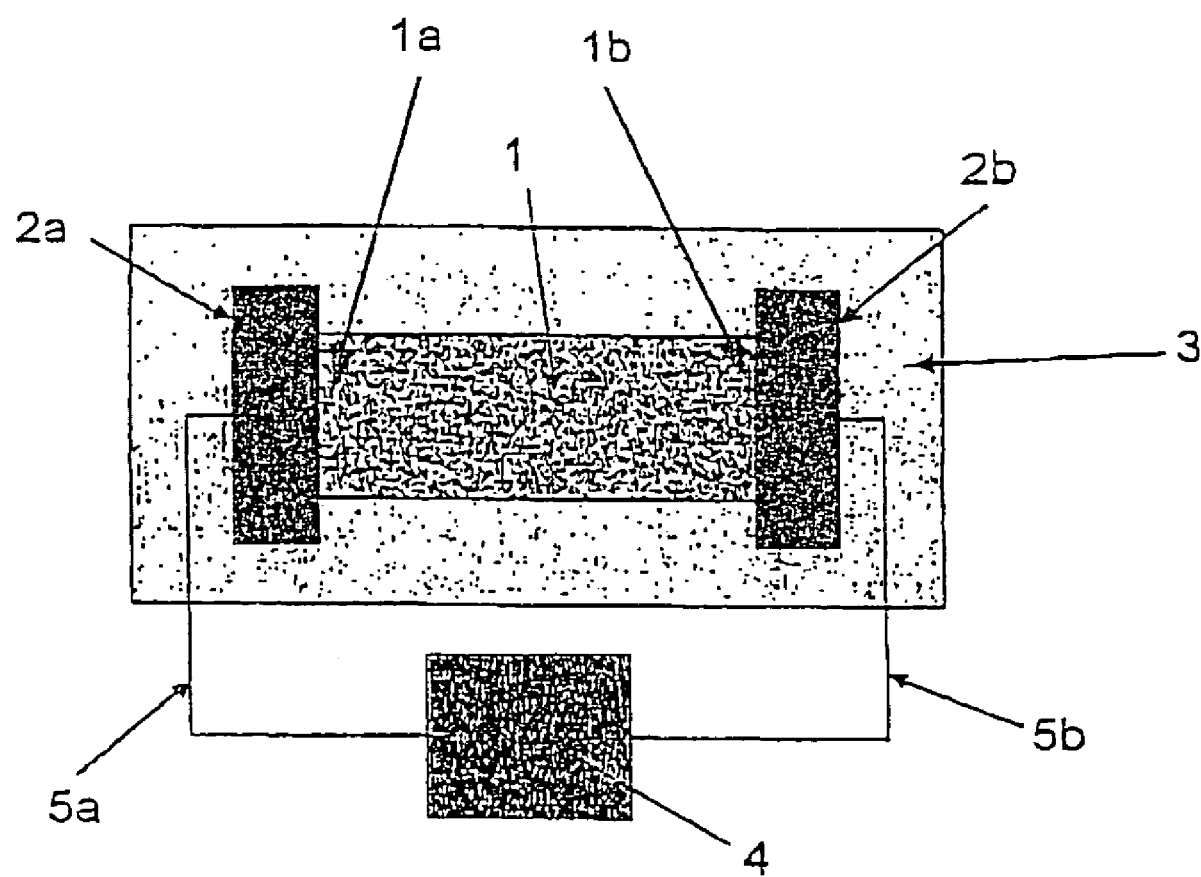
FIG. 1 is a schematic view of a preform shaping apparatus or preform tooling according to the present invention.

An apparatus under the invention to set a fiber preform or a fabric preform by activating a binder substance has a preform shaping apparatus which is used to mold a preform from a dry semi-finished fiber material containing carbon fibers. Two electrodes are integrated into this apparatus which are used to apply a voltage to the preform. If a preform is located between the electrodes, or a preform is connected to the electrodes, the preform can be heated directly (direct resistance heating) to activate a binder applied to the preform. The electrically conductive carbon fibers of the preform are used as heating elements by applying a voltage on both sides to the preform through the electrodes. Due to the resistance of the carbon fibers, there is an ensuing flow of electrical current and consequently a loss of electrical power at the resistance in the form of heat. The result is heating of the preform, which can take place within seconds, depending on electrical power and the thickness of the preform. The preform shaping apparatus is scarcely heated during this process. When integrating the technology described, specifically the electrodes in the preform shaping apparatus, care must be taken to ensure that the preform shaping apparatus itself is not conductive and/or that it is electrically insulated from the electrodes and the preform in the contact area.

In an advantageous embodiment, a voltage source with which the voltage is applied to the electrodes is integrated into the apparatus under the invention. In a further advantageous embodiment, the apparatus under the invention has a device to supply a binder substance with the aid of which a binder is supplied to the semi-finished fiber material or to the preform. A binder substance supply device can be a surface spray or a feeder pipe. The apparatus described and/or the method described serve to activate a binder on preforms or semi-finished fiber materials which consist entirely or at least partially of carbon fibers by applying an electrical voltage to the carbon fibers of the preform. The resulting set preforms can be saturated subsequently with a substantial quantity of a matrix—usually 25 to 85 percent by volume relative to the final component—and then cured to produce the final component.

The apparatus from the invention and/or the method from the invention reveal a number of advantages:

Direct heating of the preform results in very rapid heating of the preform within a few seconds, There is scarcely any heating of the preform tooling, In contrast to conventional methods, in which tooling components are heated along with the preform and have to be cooled down again before the next cycle, short cycle times are possible with the method presented. Higher preform volumes can be produced per unit of time.

The single FIG. 1 shows a preform shaping apparatus or preform tooling 3, represented as a simplified block shape, in which a preform, represented as a simplified rectangle, is inserted directly in the middle. Two electrodes 2a and 2b are located inside the preform tooling in such a way that a voltage can be applied at the two ends 1a and 1b of the preform 1 with the aid of the electrodes 2. Each of the two electrodes 2a or 2b is furnished with an electrical lead 5a or 5b which is connected to a voltage source 4 shown below the shaping apparatus. Using these leads and the voltage source 4, a voltage is applied to the preform 1. Because of the applied voltage, a current flow results in the carbon fibers of the preform 1 which represent an electrical resistance. The loss of electrical power occurring at the resistance, or the carbon fibers, heats the preform. A binder introduced into the preform, or applied to it, in the form of a solid, unmodified epoxy resin on a bisphenol-A base or a copolyamide adhesive stabilizer of adhesive polymer, is activated as a result, resulting in the preform being set in the desired shape.

What is claimed is:

1. Method for fixating a fiber preform comprising the steps of:
   molding a dry semi-finished fiber material containing carbon fibers or consisting thereof into a fiber preform of a predetermined shape;
   one of subsequently applying a binder to the fiber preform and bonding the binder substance with the fiber preform or applying a binder to the semi-finished fiber material and bonding the binder substance with the semi-finished fiber material prior to molding the fiber preform, wherein at least one of a mass of the binder substance amounts to more than 2 and up to 5 percent of a mass of the semi-finished fiber material or of the fiber preform;
   activating the binder substance by increasing a temperature of the fiber preform and the binder substance wherein an electrical current is conducted through at least one part of the carbon fibers to increase the temperature of the fiber preform; and
   subsequently saturating the fiber preform with a matrix, wherein the quantity of the matrix amounts to 25 to 85 percent by volume of the finished fiber preform.

2. Method in accordance with claim 1 wherein the step of activation is done with a fiber preform shaping apparatus comprising at least two electrodes to be integrated or disposed on the fiber preform and the binder substance to apply a voltage to at least one part of the carbon fibers to increase the temperature of the fiber preform.

3. Method in accordance with claim 1, wherein the binder substance contains a thermosetting or thermoplastic substance or consists thereof and the binder substance is present in a powdered form.

4. Method in accordance with claim 1, wherein the binder substance contains at least one of a copolyamide adhesive stabilizer of adhesive polymer or consists thereof and an epoxy resin preferably on a bisphenol-A base or consists thereof.

5. Method in accordance with claim 2, wherein a voltage source is integrated into the fiber shaping apparatus or is positioned outside the fiber shaping apparatus to apply a voltage to the electrodes.

6. Method in accordance with claim 2, wherein at least one of the semi-finished fiber material or the fiber preform containing carbon fibers or consisting thereof is disposed at or between the electrodes in such a way to conduct the electrical current in at least a part of the carbon fibers.

7. Method in accordance with claim 1, wherein the semi-finished fiber material contains a woven material, a multiaxial reinforcement or another semi-finished cloth material or consists thereof.

8. Method in accordance with claim 2, wherein the step of applying a binder is done with a binder substance feeder device that is integrated into the fiber preform shaping apparatus or is located thereon.

9. Method for fixating a fiber preform comprising the steps of:
   molding a dry semi-finished fiber material containing carbon fibers or consisting thereof into a fiber preform with a predetermined shape;
   one of subsequently applying a binder to the fiber preform and bonding the binder substance with the fiber preform or applying a binder to the semi-finished fiber material and bonding the binder substance with the semi-finished fiber material prior to molding the fiber preform, wherein the binder substance contains at least a copolyamide adhesive stabilizer of adhesive polymer;
   activating the binder substance by increasing a temperature of the fiber preform and the binder substance wherein an electrical current is conducted through at least one part of the carbon fibers to increase the temperature of the fiber preform; and
   subsequently saturating the fiber preform with a matrix, wherein the quantity of the matrix amounts to 25 to 85 percent by volume in the fixated and saturated fiber preform, and wherein a mass of the binder substance amounts to more than 2 and up to 5 percent of a mass of one of the semi-finished fiber material or of the fiber preform.

10. Method in accordance with claim 9, wherein the step of activation is done with a fiber preform shaping apparatus comprising at least two electrodes to be integrated or disposed on the fiber preform and the binder substance to apply a voltage to at least one part of the carbon fibers to increase the temperature of the fiber preform.

11. Method in accordance with claim 9, wherein the binder substance contains a thermosetting or thermoplastic substance and, the binder substance is present in a powered form.

12. Method in accordance with claim 9, wherein the binder substance further contains an epoxy resin on a bisphenol-A base.

13. Method in accordance with claim 10, wherein a voltage source is integrated into the fiber shaping apparatus or is positioned outside the fiber shaping apparatus to apply a voltage to the electrodes.

14. Method in accordance with claim 10, wherein at least one of the semi-finished fiber material or the fiber preform containing carbon fibers or consisting thereof is disposed at or between the electrodes in such a way to conduct the electrical current in at least a part of the carbon fibers.

15. Method in accordance with claim 9, wherein the semi-finished fiber material contains a woven material, a multiaxial reinforcement or another semi-finished cloth material or consists thereof.

16. Method in accordance with claim 10, wherein the step of applying a binder is done with a binder substance feeder device that is integrated into the fiber preform shaping apparatus or is located thereon.

* * * * *